(12) United States Patent
Batur et al.

(10) Patent No.: US 9,767,544 B2
(45) Date of Patent: *Sep. 19, 2017

(54) SCENE ADAPTIVE BRIGHTNESS/CONTRAST ENHANCEMENT

(71) Applicant: Texas Instruments Incorporated, Dallas, TX (US)

(72) Inventors: Aziz Umit Batur, Dallas, TX (US); Rajesh Narasimha, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,272

(22) Filed: Jun. 8, 2015

(65) Prior Publication Data
US 2015/0269717 A1    Sep. 24, 2015

Related U.S. Application Data

(63) Continuation of application No. 13/049,609, filed on Mar. 16, 2011, now Pat. No. 9,055,227.
(Continued)

(51) Int. Cl.
G06T 5/40 (2006.01)
H04N 5/217 (2011.01)
H04N 5/232 (2006.01)
H04N 5/235 (2006.01)
G06T 5/00 (2006.01)

(52) U.S. Cl.
CPC .............. *G06T 5/40* (2013.01); *G06T 5/002* (2013.01); *G06T 5/009* (2013.01); *H04N 5/217* (2013.01); *H04N 5/2351* (2013.01); *H04N 5/23229* (2013.01); *G06T 2207/10004* (2013.01);
(Continued)

(58) Field of Classification Search
None
See application file for complete search history.

(56) References Cited

U.S. PATENT DOCUMENTS 5,450,502 A * 9/1995 Eschbach ................ G06T 5/007
358/447
5,546,134 A * 8/1996 Lee .......................... H04N 5/20
348/673

(Continued)

*Primary Examiner* — Tsung-Yin Tsai
(74) *Attorney, Agent, or Firm* — Gregory J. Albin; Charles A. Brill; Frank D. Cimino

(57) ABSTRACT

A method for brightness and contrast enhancement includes computing a luminance histogram of a digital image, computing first distances from the luminance histogram to a plurality of predetermined luminance histograms, estimating first control point values for a global tone mapping curve from predetermined control point values corresponding to a subset of the predetermined luminance histograms selected based on the computed first distances, and interpolating the estimated control point values to determine the global tone mapping curve. The method may also include dividing the digital image into a plurality of image blocks, and enhancing each pixel in the digital image by computing second distances from a pixel in an image block to the centers of neighboring image blocks, and computing an enhanced pixel value based on the computed second distances, predetermined control point values corresponding to the neighboring image blocks, and the global tone mapping curve.

20 Claims, 9 Drawing Sheets

Related U.S. Application Data

(60) Provisional application No. 61/314,929, filed on Mar. 17, 2010.

(52) U.S. Cl.
CPC .............. *G06T 2207/20021* (2013.01); *G06T 2207/20081* (2013.01)

(56) References Cited

U.S. PATENT DOCUMENTS

| | | | | |
|---|---|---|---|---|
| 6,018,588 A * | 1/2000 | Kim | ........................ | G06T 5/007 382/167 |
| 6,266,102 B1 * | 7/2001 | Azuma | ................... | H04N 5/202 348/252 |
| 6,373,533 B1 * | 4/2002 | Kawabata | ................ | G06T 5/009 348/624 |
| 7,081,906 B2 * | 7/2006 | Kim | ..................... | G09G 3/2022 345/63 |
| 7,248,743 B2 * | 7/2007 | Murakami | ................ | A47L 9/26 382/162 |
| 7,605,872 B2 * | 10/2009 | Chen | ........................ | H04N 9/68 348/678 |
| 7,791,656 B2 | 9/2010 | Katagiri et al. | | |
| 7,839,455 B2 * | 11/2010 | Harada | ..................... | H04N 5/20 348/672 |
| 7,956,932 B2 * | 6/2011 | Miyazawa | .............. | G06T 5/002 348/625 |
| 7,990,443 B2 | 8/2011 | Katagiri et al. | | |
| 8,089,560 B2 * | 1/2012 | Tsutsumi | ............... | H04N 5/202 345/690 |
| 8,155,434 B2 * | 4/2012 | Kerofsky | ............. | G09G 3/2003 382/162 |
| 8,379,040 B2 * | 2/2013 | Mori | ........................ | G09G 3/22 345/589 |
| 9,055,227 B2 | 6/2015 | Batur et al. | | |
| 2006/0083425 A1 * | 4/2006 | Moldvai | ................ | G06T 5/009 382/169 |
| 2007/0040914 A1 * | 2/2007 | Katagiri | ................ | H04N 5/243 348/221.1 |
| 2008/0030450 A1 * | 2/2008 | Yamagishi | ............... | G09G 3/20 345/89 |
| 2009/0136152 A1 * | 5/2009 | Kameyama | .............. | H04N 1/60 382/275 |
| 2009/0251399 A1 * | 10/2009 | Kim | .................... | G09G 3/3406 345/89 |
| 2010/0302405 A1 | 12/2010 | Katagiri et al. | | |
| 2011/0096989 A1 * | 4/2011 | Narasimha | ............. | H04N 5/243 382/169 |
| 2011/0229019 A1 | 9/2011 | Batur et al. | | |

* cited by examiner

SCENE ADAPTIVE BRIGHTNESS/CONTRAST ENHANCEMENT

CROSS-REFERENCE TO RELATED APPLICATIONS

This application is a continuation of U.S. patent application Ser. No. 13/049,609, filed Mar. 16, 2011, which application claims benefit of U.S. Provisional Patent Application Ser. No. 61/314,929, filed Mar. 17, 2010, both of which are incorporated by reference herein in their entirety.

BACKGROUND OF THE INVENTION

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., sensor with a 2560×1920 pixel array) provides quality offered by traditional film cameras.

As the camera sensor and signal processing technologies advanced, the nominal performance indicators of camera performance, e.g., picture size, zooming, and range, reached saturation in the market. Then, end users shifted their focus back to actual or perceivable picture quality. The criteria of users in judging picture quality include signal to noise ratio (SNR) (especially in dark regions), blur due to hand shake, blur due to fast moving objects, natural tone, natural color, etc.

The perceived quality of still images and video is heavily influenced by how brightness/contrast of a scene is rendered, which makes brightness/contrast enhancement (BCE) one of the fundamental parts of an image pipeline. BCE is a challenging problem because human perception of brightness/contrast is quite complex and is highly dependent on the content of a still image or video frames. Many current BCE methods do not adequately address this complexity. When tested on large sets of images, these methods may fail in certain scenes (e.g., flat objects, clouds in a sky) because image content is very diverse. That is, many current BCE methods apply a fixed technique to all images/frames regardless of content and, as a result, may produce poor quality results on some images/frames because they do not adapt to content variation. Accordingly, improvements in BCE techniques are desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
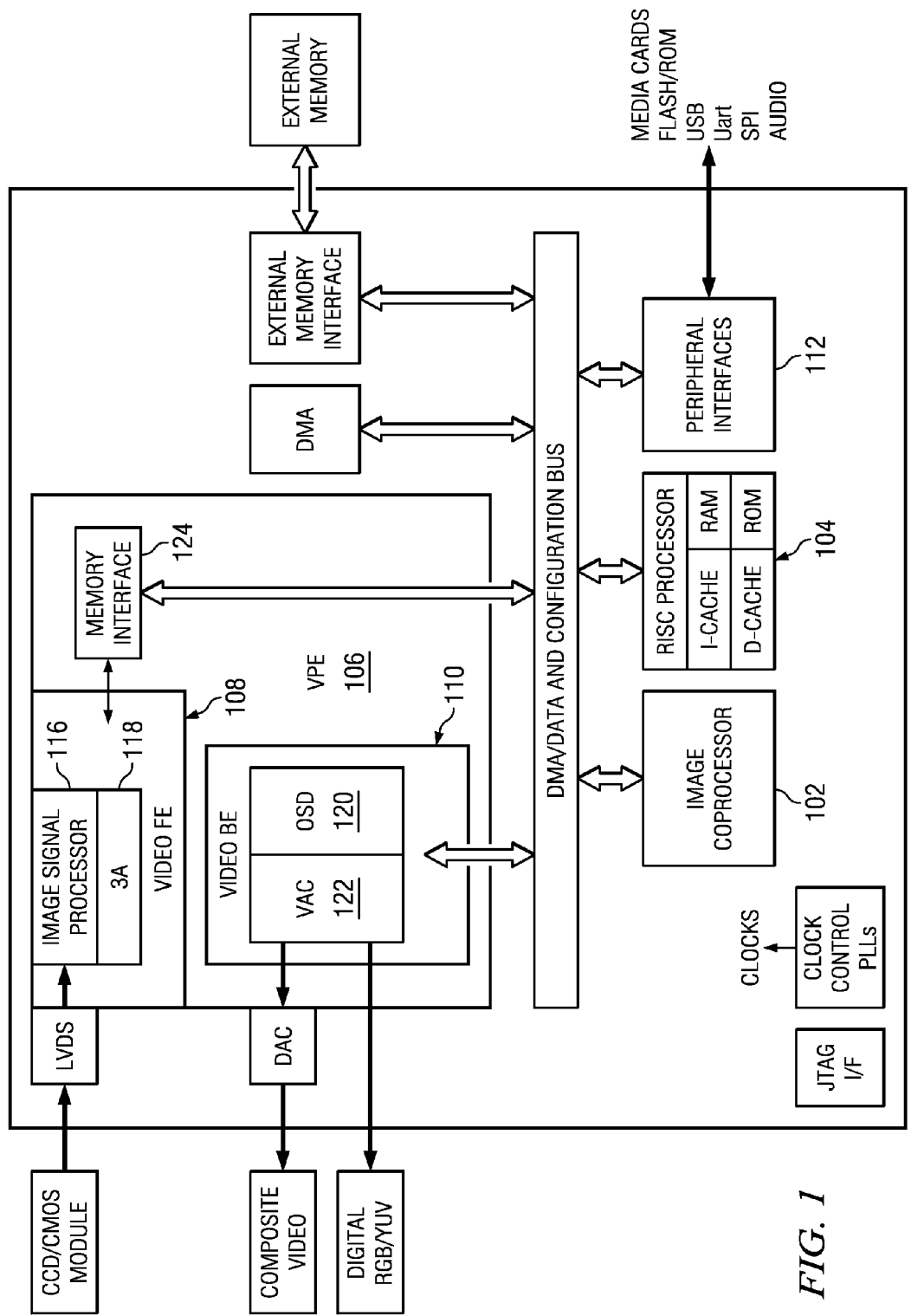
FIG. 1 shows a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

As used herein, the term digital image data refers to pixels in a digital image. A digital image may be a single still digital image or a frame (or subset of a frame such as, for example, a slice, a field, a video object plane, a picture, etc.) of digital image data in a digital video sequence. The term digital image data may also refer to luminance data and/or chrominance data of pixels. For example, a block of digital image data may be composed of pixels having both luminance data and chrominance data, pixels having only luminance data, or pixels having only chrominance data.

Embodiments of the invention provide for BCE that uses a set of prototypes to adapt the BCE behavior to different scene types. In general, given a new digital image, the BCE interpolates from the set of prototypes to determine the best brightness/contrast enhancement for the digital image. The set of prototypes is developed from a set of representative digital images that includes a wide array of scene types and is stored for use by the BCE. Thus, the BCE can be tuned for many different scene types. Using a set of prototypes to adapt BCE for different scene types improves brightness/contrast enhancement for all scene types.

In some embodiments of the invention, global brightness/contrast enhancement (GBCE) using a set of prototypes designed for GBCE is provided. In other embodiments of the invention, local brightness/contrast enhancement (LBCE) using a set of prototypes designed for LBCE is provided. In such embodiments, both GBCE and LBCE are performed. Further, the LBCE prototypes are generated using the GBCE prototypes. In general, LBCE operates on small areas, e.g., subsets or blocks of a digital image, while GBCE operates on the entire digital image. Tests have shown that applying both GBCE and LBCE to a digital image outperforms the use of GBCE alone in almost all cases. However, LBCE is more computationally complex.

FIG. 1 shows a digital system suitable for an embedded system in accordance with one or more embodiments of the invention that includes, among other components, a DSP-based image coprocessor (ICP) (102), a RISC processor (104), and a video processing engine (VPE) (106). The RISC processor (104) may be any suitably configured RISC processor. The VPE (106) includes a configurable video processing front-end (Video FE) (108) input interface used for video capture from imaging peripherals such as image sensors, video decoders, etc., a configurable video processing back-end (Video BE) (110) output interface used for display devices such as SDTV displays, digital LCD panels, HDTV video encoders, etc, and memory interface (124) shared by the Video FE (108) and the Video BE (110). The digital system also includes peripheral interfaces (112) for various peripherals that may include a multi-media card, an audio serial port, a Universal Serial Bus (USB) controller, a serial port interface, etc.

The Video FE (108) includes an image signal processor (ISP) (116), and a 3A statistic generator (3A) (118). The ISP (116) provides an interface to image sensors and digital video sources. More specifically, the ISP (116) may accept raw image/video data from a sensor (CMOS or CCD) and can accept YUV video data in numerous formats. The ISP (116) also includes a parameterized image processing module with functionality to generate image data in a color format (e.g., RGB) from raw CCD/CMOS data. The ISP (116) is customizable for each sensor type and supports video frame rates for preview displays of captured digital images and for video recording modes. The ISP (116) also includes, among other functionality, an image resizer, statistics collection functionality, and a boundary signal calculator. The 3A module (118) includes functionality to support control loops for auto focus, auto white balance, and auto exposure by collecting metrics on the raw image data from the ISP (116) or external memory. In one or more embodiments of the invention, the Video FE (108) is configured to perform at least one of the BCE methods as described herein.

The Video BE (110) includes an on-screen display engine (OSD) (120) and a video analog encoder (VAC) (122). The OSD engine (120) includes functionality to manage display data in various formats for several different types of hardware display windows and it also handles gathering and blending of video data and display/bitmap data into a single display window before providing the data to the VAC (122) in YCbCr format. The VAC (122) includes functionality to take the display frame from the OSD engine (120) and format it into the desired output format and output signals required to interface to display devices. The VAC (122) may interface to composite NTSC/PAL video devices, S-Video devices, digital LCD devices, high-definition video encoders, DVI/HDMI devices, etc.

The memory interface (124) functions as the primary source and sink to modules in the Video FE (108) and the Video BE (110) that are requesting and/or transferring data to/from external memory. The memory interface (124) includes read and write buffers and arbitration logic.

The ICP (102) includes functionality to perform the computational operations required for compression and other processing of captured images. The video compression standards supported may include one or more of the JPEG standards, the MPEG standards, and the H.26x standards. In one or more embodiments of the invention, the ICP (102) is configured to perform computational operations for a BCE method as described herein.

In operation, to capture an image or video sequence, video signals are received by the video FE (108) and converted to the input format needed to perform video compression. Prior to the compression, a BCE method as described herein may be applied as part of processing the captured video data. The video data generated by the video FE (108) is stored in the external memory. The video data is then encoded, i.e., compressed. During the compression process, the video data is read from the external memory and the compression computations on this video data are performed by the ICP (102). The resulting compressed video data is stored in the external memory. The compressed video data is then read from the external memory, decoded, and post-processed by the video BE (110) to display the image/video sequence.

Figure 2:
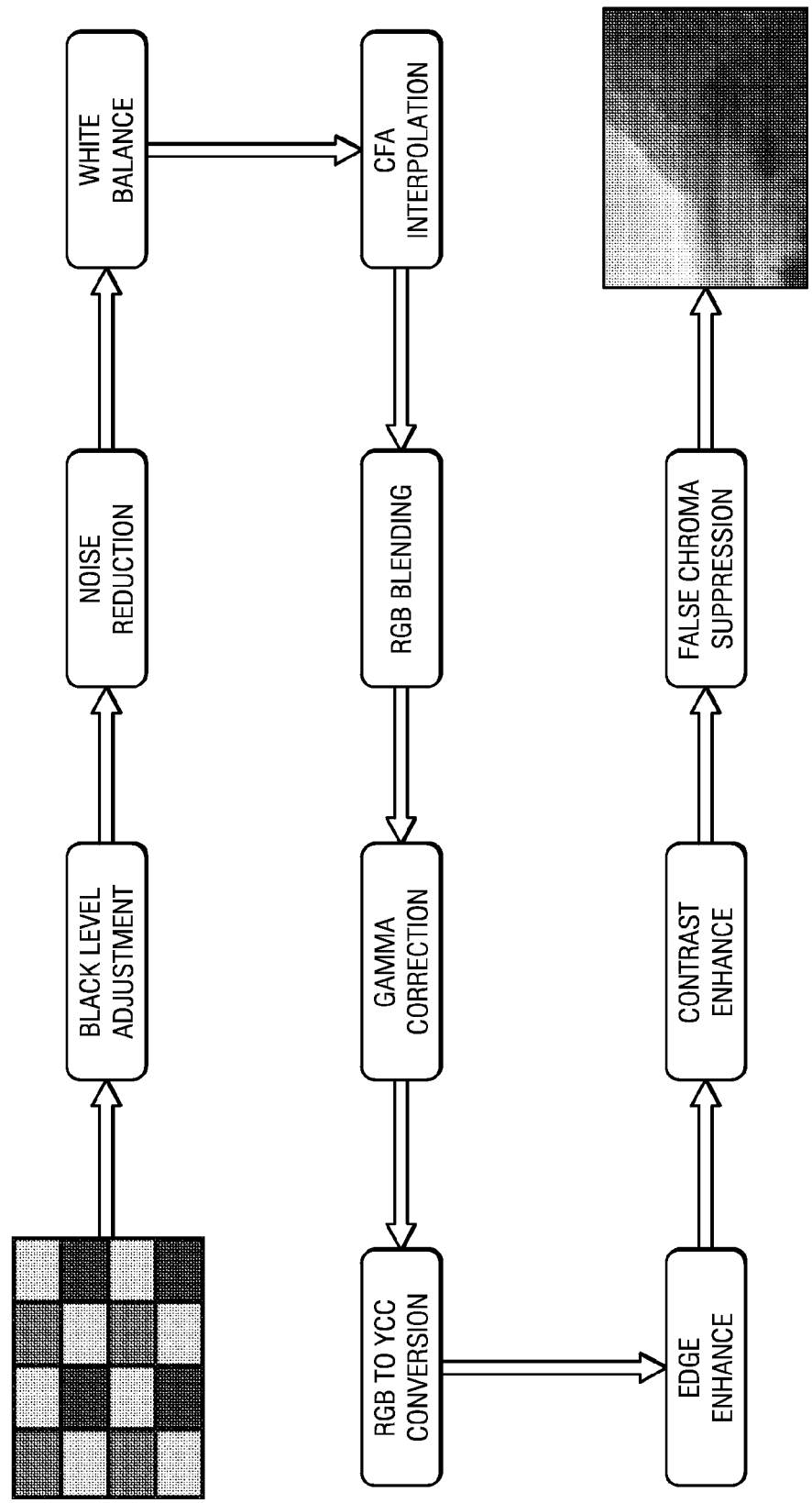
FIG. 2 shows a block diagram of an image processing pipeline in accordance with one or more embodiments of the invention.

FIG. 2 is a block diagram illustrating digital camera control and image processing (the "image pipeline") in accordance with one or more embodiments of the invention. One of ordinary skill in the art will understand that similar functionality may also be present in other digital devices (e.g., a cell phone, PDA, etc.) capable of capturing digital images and/or digital video sequences. While each stage in the pipeline is shown in sequence, one of ordinary skill in the art will understand that image processing is parallel in nature and thus, each stage in the pipeline does not necessarily receive an entire digital image before processing can begin. Further, one of ordinary skill in the art will understand that an image pipeline may contain more or fewer stages, and/or may vary in order. A brief description of the function of each stage in accordance with one or more embodiments is provided below. Note that the typical color CCD consists of a rectangular array of photosites (pixels) with each photosite covered by a filter (the CFA): typically, red, green, or blue. In the commonly-used Bayer pattern CFA, one-half of the photosites are green, one-quarter are red, and one-quarter are blue.

As shown in FIG. 2, the initial stage of the pipeline, black level adjustment, sets sensor black to image black. That is, in order to optimize the dynamic range of the pixel values represented by a CCD imager, the pixels representing black are corrected since the CCD cell may record some non-zero current at these pixel locations. The black level adjustment adjusts for this difference by subtracting offsets from each pixel value while clamping/clipping to zero to avoid a negative result. One simple way to calculate this adjustment is to take a picture of complete black, e.g., by leaving on the lens cap or camera cover. The result of the calculation is the three base offsets that characterize the dark current from the sensor and lens flare. Failure to subtract these offsets may have a negative effect on contrast in the final image.

The noise reduction stage attempts to remove the various sources of noise in a digital image, e.g., optical, electrical, digital and power, by averaging similar neighboring pixels. Typically, if the noise level is high then more weight is given to the average of similar neighbors. Conversely, if the noise level is low, more weight is given to the original pixel value. An Optical Electrical Conversion Function (OECF) chart captured using a uniform lighting source may be used to determine the noise level for different intensities. The 12 uniform gray patches on the OECF chart provide 12 power levels, which may then be used to arrange noise using either a linear or square-root model depending on the sensor and gain (or ISO) level.

The white balance stage attempts to make white white in a digital image by automatically compensating for color differences introduced by light sources, such as the differences between incandescent, fluorescent, natural light sources, XE strobe, and W-LED flash, as well as mixed light conditions. That is, the illumination during the recording of a scene in a digital image may be different from the illumination when viewing the final digital image. This difference may result in a different color appearance that may be seen, for example, as the bluish appearance of a face or the reddish appearance of the sky. Also, the sensitivity of each color channel varies such that grey or neutral colors may not be represented correctly.

In some embodiments of the invention, the white balance function compensates for these imbalances in colors by computing the average brightness of each color component and by determining a scaling factor for each color component. Since the illuminants are unknown, a frequently used technique just balances the energy of the three colors. This equal energy approach requires an estimate of the unbalance between the color components. In some embodiments of the invention, the appropriate gains needed for white balance may be calculated using a ColorChecker chart to obtain the average RGB values of six gray patches. The red and blue gains may be computed using mean square error minimization while the green gain may be set to one, eliminating one set of calculations.

Many digital cameras have a single sensor and thus are limited to obtaining one color component at each pixel in a digital image even though three components are needed to represent RGB color. However, many stage of the image pipeline need full color resolution for each pixel in a digital image. The CFA interpolation stage interpolates the two missing color components for each pixel from neighboring pixels.

The RGB blending stage is included because different sensors may produce different RGB values for the same color. This stage uses a matrix that converts the sensor RGB color space to a standard RGB color space such as the Rec709 RGB color space. The matrix may be determined using an image of a ColorChecker chart to obtain average RGB values of 18-color patches after white balancing, and then using constrained minimization on reference RGB values after applying an inverse Gamma correction.

The gamma correction stage compensates for the nonlinearity of output display devices and printers, i.e., it compensates for the differences between a digital image generated by the CCD sensor and the digital image displayed on a display device or printed on a page. A standard gamma correction such as Rec709 or SMPTE240M may be used to calibrate this stage. Special displays, such as those used in airport computers or military applications, may require nonstandard gamma correction. In such cases, a particular gamma correction lookup table for the special display may be used for gamma correction.

Human eyes are more sensitive to luminance (Y) than color (Cb, Cr) information, and so each component may be processed using different precisions. The RGB to YCC conversion stage transforms a digital image from an RGB color space to a YCbCr color space. This conversion may be a linear transformation of each Y, Cb, and Cr value as a weighted sum of the R, G, and B values of a pixel.

The nature of CFA interpolation filters introduces a low-pass filter that smoothes the edges in the image. To sharpen a digital image, the edge enhancement stage detects and enhances the edges. The edge enhancement may compute the edge magnitude in the Y channel at each pixel, and then scale the edge magnitude and add it to the original luminance (Y) image to enhance the sharpness of the edges.

The contrast enhancement stage enhances the brightness and contrast of a digital image. This stage performs brightness and contrast enhancement according to a method for BCE as described herein.

The false chroma suppression stage corrects various color artifacts. For example, edge enhancement is only performed in the Y channel of a digital image. This may cause misalignment in the color channels at the edges, resulting in rainbow-like artifacts. The false chroma suppression stage suppresses the color components, Cb and Cr, at the edges to reduce such artifacts.

Embodiments of methods for brightness and contrast enhancement (BCE) are now described in more detail under the headings of Global Brightness/Contrast Enhancement (GBCE) and Local Brightness/Contrast Enhancement (LBCE). Embodiments of the GBCE method and the LBCE method operate using sets of prototypes that are pre-generated and stored in a digital camera or other devices that enhance contrast in captured digital images. Accordingly, embodiments of training methods for generating GBCE prototypes and LBCE prototypes are also described under the corresponding headings.

Global Brightness/Contrast Enhancement (GBCE)

Figure 3A:
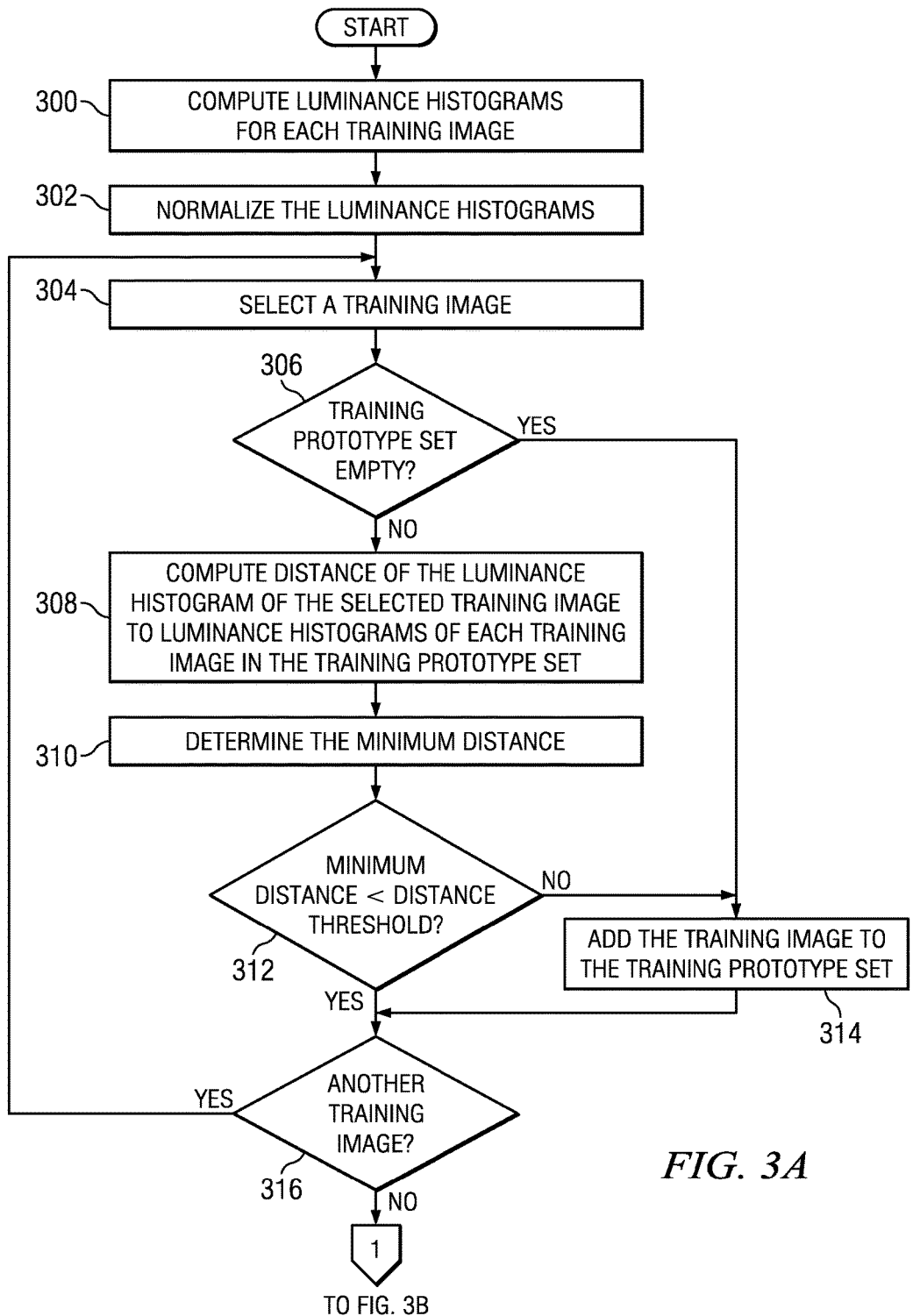
FIGS. 3A and 3B show a flow graph of a training method for global brightness and contrast enhancement in accordance with one or more embodiments of the invention.
Figure 3B:
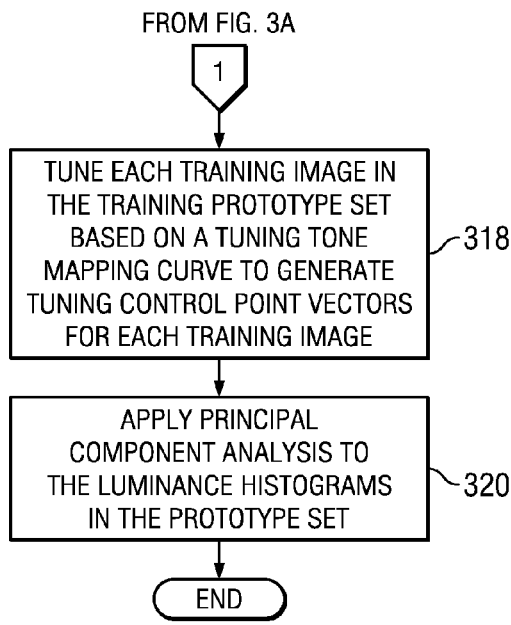

FIGS. 3A and 3B show a flow diagram of a training method for generating prototypes for GBCE in accordance with one or more embodiments of the invention. The training method uses a set of training images that are representative of scenes typically captured using a digital camera. A large and diverse set of training images may be used to improve the content of the generated prototypes. In some embodiments of the invention, approximately a thousand images are used for the training.

Initially, a luminance histogram is computed for each of the training images (300). Any suitable technique for computing the luminance histogram may be used. The number of bins in the luminance histogram depends on the dynamic range of the luminance image. For simplicity of explanation, this dynamic range is assumed to be 0-255 herein such that the luminance histograms have 256 bins. One of ordinary skill in the art will understand other embodiments of the invention in which the dynamic range is different. Further, the luminance histograms are normalized with the number of pixels in the digital image such that the sum of a luminance histogram, i.e., the sum of all the bin values of a histogram, is the same for all of the training images (302). The sum of a luminance histogram is referred to as histSum herein.

A subset of the training images, i.e., the training prototype set, is then determined based on the normalized luminance histograms. To select the training prototype subset, a training image from the full set of training images is selected (306). The training images may be processed in any suitable order.

If the training prototype set is empty (306), then the selected training image is added to the training prototype set (316), and processing continues with the next training image in the full set of training images (304)), if any (316).

If the training prototype set is not empty (306), then the selected training image is considered for addition to the training prototype set. The distance between the luminance histogram of the selected training image and each of the luminance histograms of the images in the training prototype set is computed (308). The distance may be computed using any suitable technique, such as for example, Euclidean distance or chi-squared distance. In some embodiments of the invention, each distance is computed as the sum of absolute differences (SAD) between the luminance histogram of the selected training image and a luminance histogram of an image in the training prototype set.

The minimum distance of the computed distances is then determined (310), and if this minimum distance is larger than a threshold, the selected training image is added to the training prototype set (314). Otherwise, the selected training image is not added to the training prototype set, and processing continues with the next training image in the full set of training images (304), if any (316). In some embodiments of the invention, the threshold is 0.9*histSum.

After all of the training images in the full set of images are considered (316), the training prototype set is complete. The luminance histograms of the images in the training prototype set are referred to as H1, H2, . . . , Hn herein where n is the number of images in the training prototype set. In some embodiments of the invention, n is around 500.

Figure 3C:
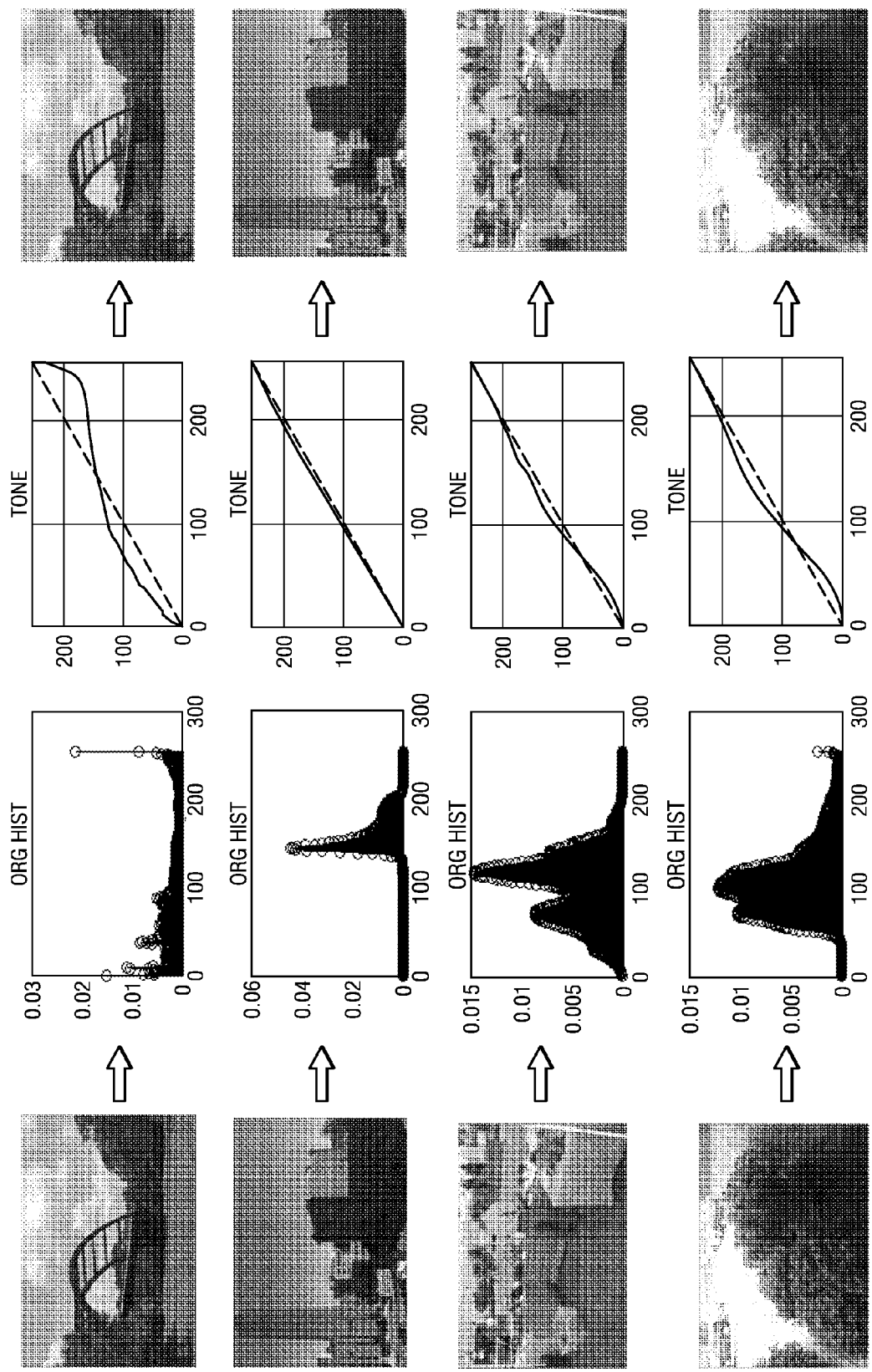
FIG. 3C shows an example of manual tuning in the training method of FIGS. 3A and 3B in accordance with one or more embodiments of the invention.

After the training prototype set is complete (316), each of the training images in the training prototype set is tuned based on a tuning tone mapping curve (318). This tuning is performed manually by a few people. For tuning of each image, the original image, the luminance histogram for that image, a tuning tone mapping curve with m adjustable control points, and an output image showing the effects of adjustments to control points in the tuning tone mapping curve on brightness and contrast may be displayed. A user may tune each of the training images by adjusting the m control points in the tuning tone mapping curve up and down to achieve the desired brightness/contrast enhancement. FIG. 3C shows an example of such an interface. In each of the tuning tone mapping curves in this figure, the dashed straight line is the unity tone mapping curve and the curved solid line is the tone mapping curve as adjusted by the user. The user may refer to the luminance histogram for a training image in deciding how what changes should be made to the tone mapping curve for that training image.

The result of the tuning of each training image is a control point vector of length m that specifies the location of each of the m control points in the final tone mapping curve selected by a user. In some embodiments of the invention, m=10 and the 10 control points are located at 0, 25, 64, 96, 128, 160, 192, 210, 225, and 256 in each tuning tone mapping curve. The locations of the control points selected by each user for each training image may be averaged to estimate an optimal tone mapping curve, i.e., an optimal control point vector, which describes the brightness/contrast preferences for that training image over the user population. The final control point vectors are referred to herein as V1, V2, . . . , Vn, where n is the number of training images in the training prototype set.

Optionally, dimensionality reduction and/or pruning techniques may be applied to the prototype set to reduce the amount of memory needed to store the prototype set (320). For example, principal component analysis (PCA) may be applied (320) to the luminance histograms H1, H2, . . . , Hn to reduce the dimensionality of the histograms, and thus the amount of memory needed to store them. PCA provides eigenvalues and eigenvectors. A threshold may be applied to the eigenvalues to determine the z dominant eigenvalues and the corresponding eigenvectors. In some embodiments of the invention, z is around 50. The n prototype histograms are projected onto the z eigenvectors to determine feature vectors F1, F2, . . . , Fn of length z. Note that each original histogram vector is of length 256 and after the application of PCA, a smaller vector of size z may be used to represent the original histogram. Pruning may also be performed to eliminate similar histogram/tone mapping curve pairs to further reduce the amount of data to be stored.

In embodiments of the invention where PCA is not applied, the output of the GBCE training is a GBCE prototype set that includes a luminance histogram vector of length 256 and a control point vector for each of the n training images in the prototype set. In embodiments of the invention where PCA is applied, the output of the GBCE training is a GBCE prototype set that includes a luminance histogram vector of length z and a control point vector for each of the n training images in the prototype set. If pruning is applied to the training prototype set, the number of luminance histogram/control point vector pairs in the GBCE prototype set will naturally be less than n. The GBCE prototype set may then be stored for use in the BCE methods of FIGS. 4 and 6.

Optionally, the training images in the training prototype set may be grouped based on scene type, such as outdoor, indoor, dark, etc. The grouping may be performed based on auxiliary data from the camera used to capture the training images such as exposure time and analog gain. The grouping may be used to reduce the search space when comparing a histogram of a training image to the training prototype set. Further, the grouping may facilitate better matching to the respective scenes and may result in picking the best tone curve for that scene.

Figure 4:
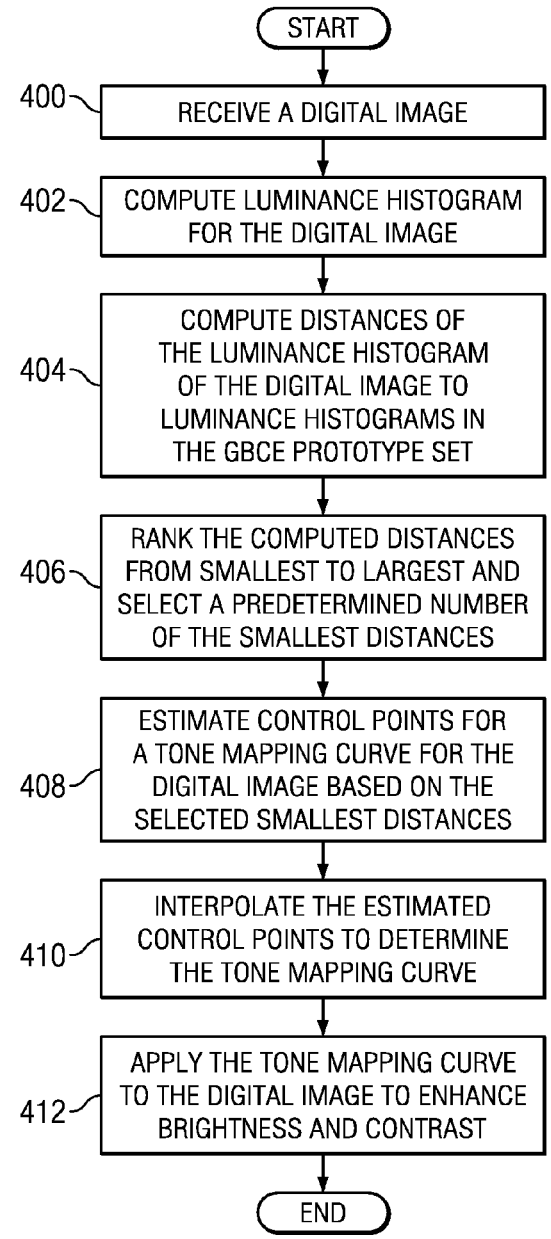
FIG. 4 shows a flow graph of a method for global brightness and contrast enhancement in accordance with one or more embodiments of the invention.

FIG. 4 is a flow diagram of a method for BCE in accordance with one or more embodiments of the invention. The method uses the output of the training method of FIGS. 3A-3B, i.e., a GBCE prototype set with luminance histogram/control point vector pairs. The description of this method assumes that there are n luminance histogram/control point vector pairs as per the description of the training method of FIGS. 3A-3B. One of ordinary skill in the art will understand embodiments of the invention where there are fewer than n pairs in the GBCE prototype set, i.e., where some pairs were pruned out during training.

Initially, a digital image is received (400) and a luminance histogram is computed for the image (402), referred to herein as Hnew. In some embodiments of the invention, a 256 bin luminance histogram is computed. Further, the luminance histogram is normalized in a similar fashion as the normalization used for the luminance histograms in the training method. The distance between the luminance histogram Hnew and each of the luminance histograms in the GBCE prototype set H1, H2, . . . , Hn is then computed (404). The distances are computed in the same way as the distances were computed when the GBCE prototype set was generated. In some embodiments of the invention, each distance is computed as the sum of absolute differences (SAD) between the luminance histogram of the digital image and a luminance histogram in the GBCE prototype set. If principal component analysis was used in the generation of the GBCE prototype set to reduce dimensionality, then the distance is computed by projecting Hnew onto the z eigenvectors and then the distance is computed to each of the feature vectors F1, F2, ..., Fn.

The computed distances are then ranked from the smallest to the largest and a predetermined number M of the smallest distance are selected (406). The ranked distances are referred to herein as d1, d2, ..., dn, where d1 is the smallest distance. The value of M may be empirically determined. In some embodiments of the invention, the value of M may range from 2 to 4.

Then, m control points for a tone mapping curve for the digital image, i.e., a control point vector referred to herein as Vnew, are estimated based on the control point vectors V1 ... VM associated with the luminance histograms H1 ... HM in the GBCE prototype set corresponding to the M smallest distances (408). In one or more embodiments of the invention, the m control points in Vnew are estimated as the weighted average of the m control points in V1 ... VM. The weights used in the computation are chosen such that V1 has the greatest weight and VM has the least weight. More specifically, the weights for each of the M control point vectors are computed as follows. The equation (k/d1)+(k/d2)+ ... +(k/dM)=1 is solved to determine a value of k. Note that this equation ensures that the weights used will add up to one. Then, the weights are computed as alfa1=k/d1, alfa2=k/d2, ..., alfaM=k/dM, where alfa1 ... alfaM are the weights. The m control points of Vnew are then estimated by computing Vnew=alfa1*V1+alfa2*V2+ ... +alfaM*VM.

The final tone mapping curve is then determined by interpolating the m control points in Vnew (410). In some embodiments of the invention, polynomial interpolation such as cubic polynomial interpolation is used. The final tone mapping curve is then applied to the digital image to enhance the brightness/contrast (412).

Local Brightness/Contrast Enhancement (LBCE)

Figure 5:
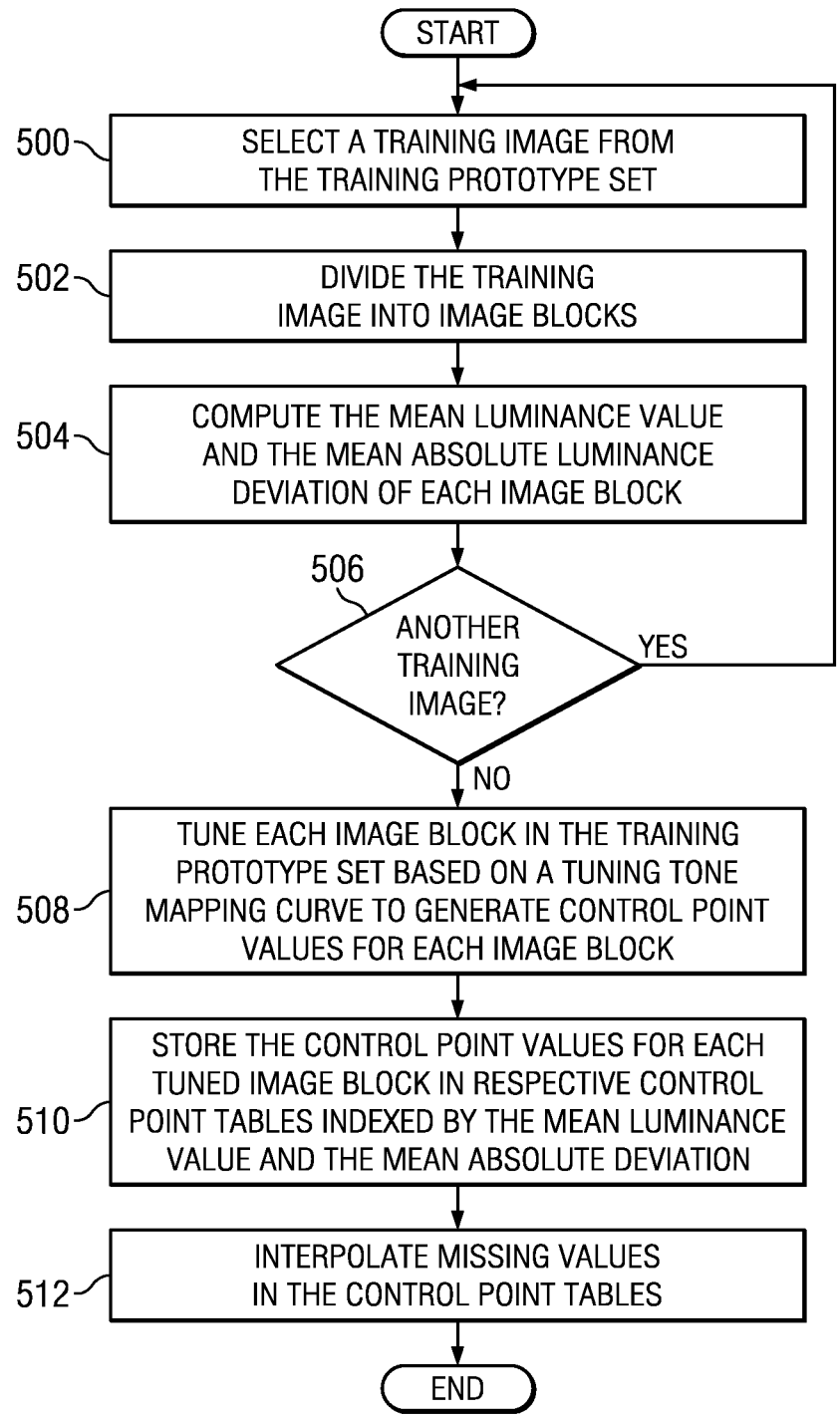
FIG. 5 shows a flow graph of a training method for local brightness and contrast enhancement in accordance with one or more embodiments of the invention.

FIG. 5 shows a flow diagram of a training method for generating control points of tone mapping curves for LBCE in accordance with one or more embodiments of the invention. The training method is performed using the training images in the GBCE training prototype set. Accordingly, the GBCE training method of FIGS. 3A and 3B is performed first. The training images in the GBCE training prototype set are then enhanced using the GBCE method of FIG. 4. The resulting enhanced training images form the training prototype set for the LBCE training.

Initially, a training image is selected from the training prototype set (500) and divided into image blocks (502). The training images may be processed in any suitable order. Further, any suitable image block size may be used. In some embodiments of the invention, the training image is divided into 209 blocks. Then, the mean luminance value, blkMean, and the mean absolute luminance deviation, blkMAD, are computed for each of the image blocks (504). The blkMean may be computed by summing the pixel values an image block and taking the average. The blkMAD of an image block may be computed as follows. First determine the differences between the blkMean and each luminance value in the image data block. Then, compute the absolute values of all the differences, and average the absolute differences. The dividing of training images into image blocks and computation of the blkMean and blkMAD for each image block is repeated for all training images in the prototype set (506).

At this point, the training prototype set contains the image blocks for the training images in the original training prototype set. Each image block is the training prototype set is tuned based on a tuning tone mapping curve with p control points, where p<m (the number of control points used to tune the prototype training images in the GBCE training method). For tuning of each image block, the original image block, a tuning tone mapping curve with p adjustable control points, and an output image block showing the effects of adjustments to control points in the tuning tone mapping curve on brightness and contrast may be displayed. A user may tune each of the prototype image blocks by adjusting the p control points in the tuning tone mapping curve up and down to achieve the desired brightness/contrast enhancement.

The result of the tuning of each image block is p control points values corresponding to the locations of each of the p control points in the final tone mapping curve selected by a user. The p control point values are referred to as V1i, V2i, ..., Vpi herein, where i identifies the image block. In some embodiments of the invention, p=3 and the 3 control points are located at blkMean/2, blkMean, (256-blkMean/2)+blkMean in each tone mapping curve. The locations of the control points selected by each user for each image block may be averaged to estimate an optimal tone mapping curve, i.e., an optimal set of p control point values, which describes the brightness/contrast preferences for that image block over the user population.

The p control point values for each tuned image block are stored in respective control point tables indexed by the mean luminance value (blkMean) and the mean absolute luminance deviation (blkMAD) (510). In some embodiments of the invention, the dimensions of the control point tables are 256×128. More specifically, there are p control point tables, T1, T2, ..., Tp and all the V1i values are stored in T1, all the V2i values are stored in T2, etc. Further, the control point values for an image block are stored in the respective control point tables at a location determined by the blkMean and blkMAD for that image block. For example, if p=3, three two-dimensional control point tables, T1, T2, and T3, are used: one for V1i, one for V2i, and one for V3i. Each of these three tables is indexed by blkMean and blkMAD. Locations in T1, T2, T3 store the V1i, V2i, and V3i values, respectively, that were computed for the image blocks. In some embodiments of the invention, if two images blocks have the same blkMean and blkMAD, they are spatially averaged.

The p control point tables may not be fully populated as there may not be sufficient image blocks in the prototype set for every possible occurrence of (blkMean,blkMAD) values. Thus, the missing values in the p control point tables are interpolated using nearby values (512). The missing values may be interpolated as follows. For each missing value in the table, find the smallest v×v neighborhood having values populated during the training and average the populated values to compute the missing value. The output of the LBCE training is p fully populated control point tables that are stored and used for the BCE method of FIG. 6.

Figure 6:
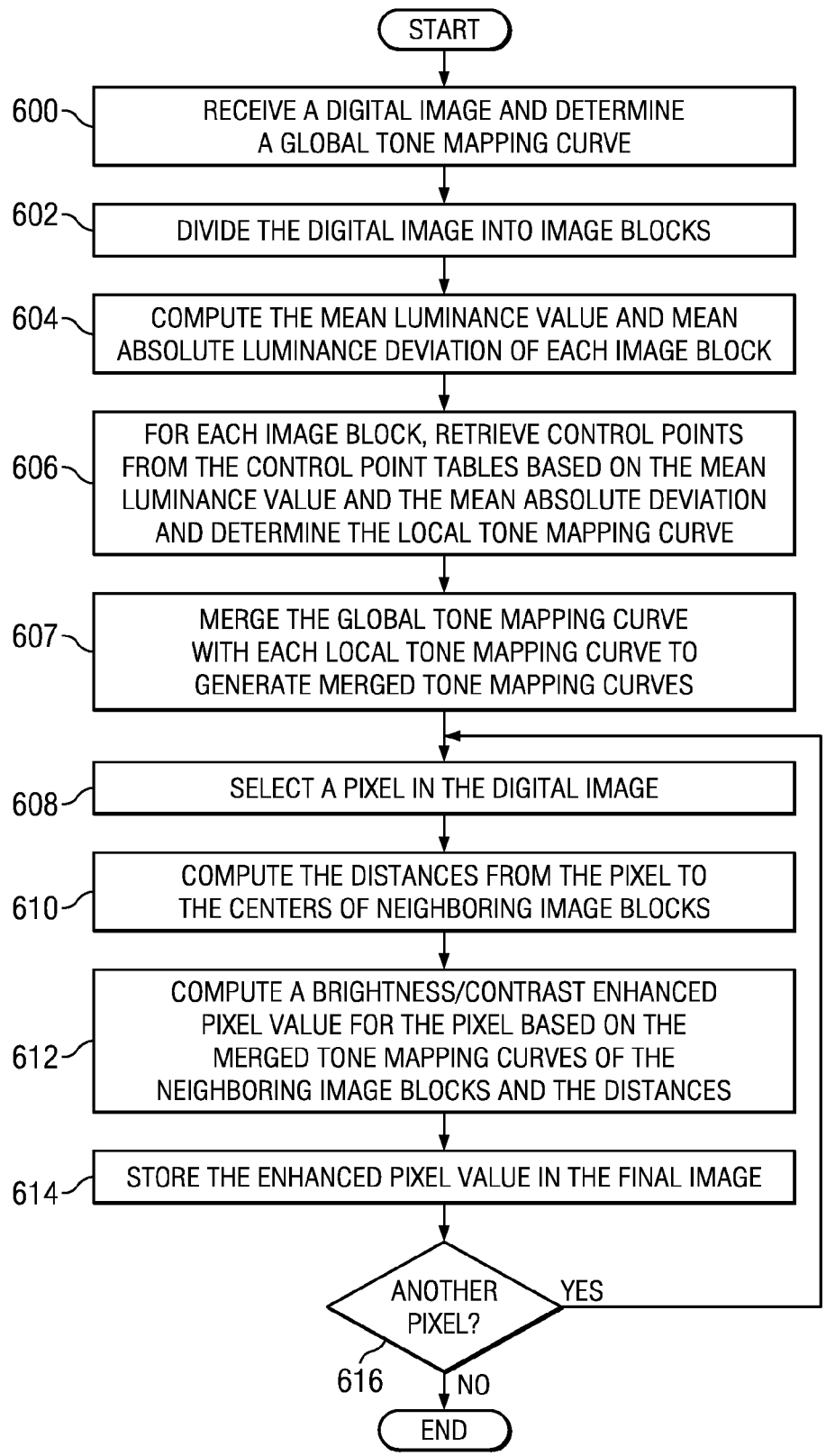
FIG. 6 shows a flow graph of a method for local brightness and contrast enhancement in accordance with one or more embodiments of the invention.

FIG. 6 is a flow diagram of a method for BCE in accordance with one or more embodiments of the invention. Initially, a digital image is received and global tone mapping curve is determined for the digital image as per steps 402-410 of the BCE method of FIG. 4 (600). The digital image is then divided into image blocks of the same size as that used in the LBCE training method (602). The mean luminance value, blkMean, and the mean absolute luminance deviation, blkMAD, is then computed for each image block (604). The blkMean and blkMAD are computed in the same way as that used in the LBCE training method. For each image block, p control point values are retrieved from the p control point tables using the blkMean and blkMAD for the image block and a local tone mapping curve is determined for the image block by interpolating the p control points (606). In some embodiments of the invention, polynomial interpolation such as cubic polynomial interpolation is used. The global tone mapping curve is then merged with each of the local tone mapping curves to generate merged tone mapping curves (607). Any suitable technique for merging the tone mapping curves may be used.

Once the merged tone mapping curves are determined, each pixel in the image is enhanced based on the merged tone mapping curves (608-616). A pixel in the digital image is selected (608) and the distances from the selected pixel to the centers of q image blocks neighboring the image block containing the selected pixel are computed (610). The pixels may be processed in any suitable order. In some embodiments of the invention, the pixels are processed in raster scan order. The computed distances are referred to as r1, . . . , rq herein.

The number of neighboring image blocks q may be empirically determined. In some embodiments of the invention, q=4. Which of the neighboring image blocks used as the q neighboring image blocks may also be empirically determined. In some embodiments of the invention, the neighboring image blocks are the top neighboring image block, the left neighboring image block, the right neighboring image block, and the bottom neighboring image block. If one of these neighboring image blocks does not exist, e.g., the image block containing the selected pixel is in a corner or along an edge of the digital image, then the neighboring image block opposite the missing neighboring image block is used to fill in for the missing image block. For example, if an imaging block has a top neighboring block, a bottom neighboring block, and a right neighboring block and the left neighboring block does not exist, the right neighboring block is used as both the right neighbor and the left neighbor.

A brightness/contrast enhanced pixel value is computed for the selected pixel based on the merged tone mapping curves of the q neighboring image blocks and the distances r1, . . . , rq (612). First, the merged tone mapping curves computed for the q neighboring image blocks are applied to the pixel to generate q tone mapped pixel values p1, . . . , pq. Then, the weighted average of the tone mapped pixel values p1, . . . , pq is computed based on the distances r1, . . . , rq. The weighted average is the enhanced pixel value and is stored in the final image (612). The enhancement process is repeated for each pixel in the digital image (614).

The weights used in the weighted average may be computed as per the following example. In this example, q=4 is assumed for simplicity of explanation. The equation (k/r1)+(k/r2)+(k/r3)+(k/r4)=1 is solved to determine k. Note that this equation ensures that the weights used will add up to 1. Then, the weights are computed as alfa1=k/r1, alfa2=k/r2, alfa3=k/r3, alfa4=k/r4 where alfa1 through alfa4 are the weights for p1, p2, p3, and p4. The weighted average is then computed as alfa1*p1+alfa2*p2+alfa3*p3+alfa4*p4.

Embodiments of the methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device, and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 7:
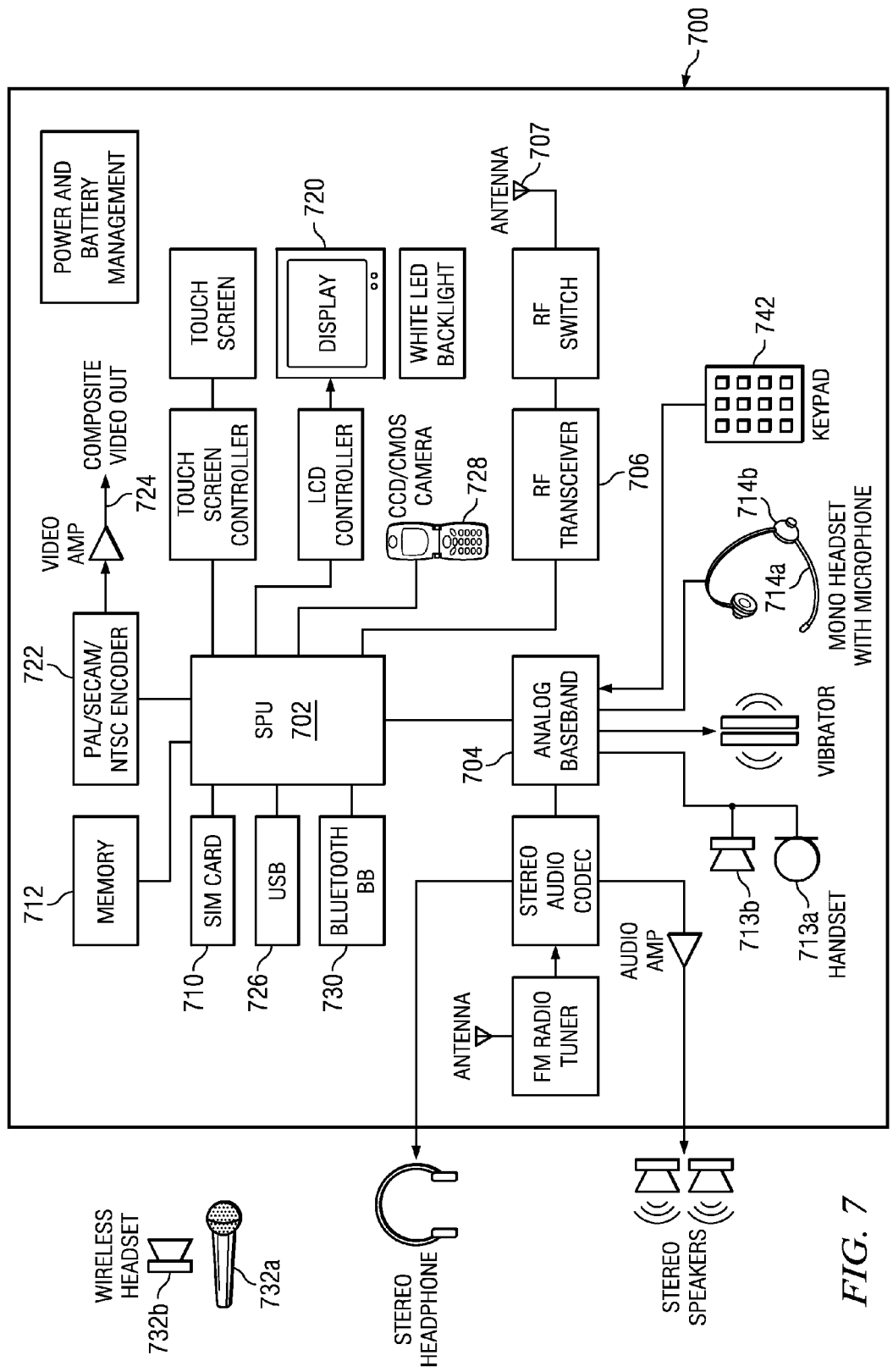
FIGS. 7 and 8 show illustrative digital systems in accordance with one or more embodiments.
Figure 8:
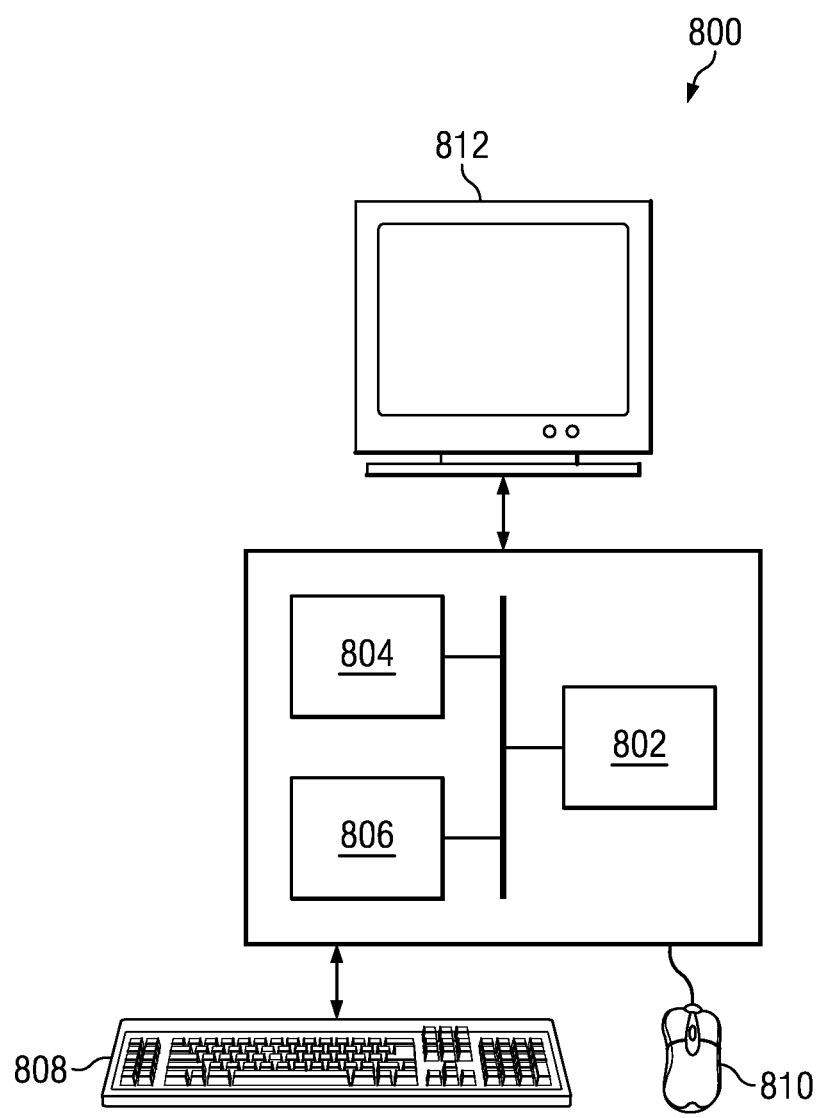

Embodiments of the methods and encoders as described herein may be implemented for virtually any type of digital system (e.g., a desk top computer, a laptop computer, a handheld device such as a mobile (i.e., cellular) phone, a personal digital assistant, a digital camera, etc.) with functionality to capture and process digital images. FIGS. 7 and 8 show block diagrams of illustrative digital systems.

FIG. 7 is a block diagram of a digital system (e.g., a mobile cellular telephone) (900) that may be configured to apply BCE to digital images as described herein. The signal processing unit (SPU) (902) includes a digital signal processing system (DSP) that includes embedded memory and security features. The analog baseband unit (904) receives a voice data stream from handset microphone (913a) and sends a voice data stream to the handset mono speaker (913b). The analog baseband unit (904) also receives a voice data stream from the microphone (914a) and sends a voice data stream to the mono headset (914b). The analog baseband unit (904) and the SPU (902) may be separate ICs. In many embodiments, the analog baseband unit (904) does not embed a programmable processor core, but performs processing based on configuration of audio paths, filters, gains, etc being setup by software running on the SPU (902).

The display (920) may also display pictures and video sequences received from a local camera (928), or from other sources such as the USB (926) or the memory (912). The SPU (902) may also send a video sequence to the display (920) that is received from various sources such as the cellular network via the RF transceiver (906) or the camera (926). The SPU (902) may also send a video sequence to an external video display unit via the encoder unit (922) over a composite output terminal (924). The encoder unit (922) may provide encoding according to PAL/SECAM/NTSC video standards.

The SPU (902) includes functionality to perform the computational operations required for video encoding and decoding. The video encoding standards supported may include, for example, one or more of the JPEG standards, the MPEG standards, and the H.26x standards. In one or more embodiments of the invention, the SPU (902) is configured to perform computational operations of BCE as described herein. Software instructions implementing the BCE may be stored in the memory (912) and executed by the SPU (902), for example, as part of processing video sequences captured by the local camera (928).

FIG. 8 shows a digital system (800) (e.g., a personal computer) that includes a processor (802), associated memory (804), a storage device (806), and numerous other elements and functionalities typical of digital systems (not shown). In one or more embodiments of the invention, a digital system may include multiple processors and/or one or more of the processors may be digital signal processors. The digital system (800) may also include input means, such as a keyboard (808) and a mouse (810) (or other cursor control device), and output means, such as a monitor (812) (or other display device). Those skilled in the art will appreciate that the input and output means may take other forms. The digital system (800) may also include an image capture device (not shown) that includes circuitry (e.g., optics, a sensor, readout electronics) for capturing video sequences. The digital system (800) may be configured to apply BCE as described herein to the captured video sequences. The digital system (800) may be connected to a network (814) (e.g., a local area network (LAN), a wide area network (WAN) such as the Internet, a cellular network, any other similar type of network and/or any combination thereof) via a network interface connection (not shown). Encoded video sequences may be received by the digital system (800) via the network and/or via a computer readable medium.

Further, those skilled in the art will appreciate that one or more elements of the aforementioned digital system (800) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (800) via removable computer readable media (e.g., floppy disk, optical disk, flash memory, USB key), via a transmission path from computer readable media on another digital system, etc.

Embodiments of the methods described herein can be useful for enhancing or improving several types of images. Further, embodiments of the methods may be applied to images as they are captured (e.g., by a digital camera or scanner), as part of a photoprocessing application or other application with image processing capability executing on a computer, and/or when the images are printed (e.g., in a printer as part of preparing to print the images). Embodiments of the methods may also be implemented as part of a device driver (e.g., a printer driver or display driver), so that the driver performs BCE on an image before the image is displayed or printed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method for brightness and contrast enhancement (BCE) of a digital image, the method comprising:
    computing a luminance histogram of the digital image;
    computing first distances from the luminance histogram to a plurality of predetermined luminance histograms;
    estimating control point values for a global tone mapping curve for the digital image from first predetermined control point values corresponding to a subset of the predetermined luminance histograms selected based on the computed first distances; and
    interpolating the estimated control point values to determine the global tone mapping curve.

2. The method of claim 1, further comprising applying the global tone mapping curve to the digital image to generate an enhanced digital image.

3. The method of claim 1, wherein the first predetermined control point values comprise a vector of control point values for each predetermined luminance histogram, and wherein estimating first control point values comprises computing weighted averages of respective control point values in the vectors of control point values corresponding to the subset of the predetermined luminance histograms.

4. The method of claim 1, wherein the predetermined luminance histograms and the first predetermined control points are predetermined by:
    computing luminance histograms for each training image in a plurality of training images;
    selecting a subset of the training images in the plurality of training images as a training prototype set based on distances from each luminance histogram to luminance histograms of training images in the training prototype set; and
    tuning each training image in the training prototype set based on a tuning tone mapping curve to generate the first predetermined control point values,
    wherein the luminance histograms of the training images in the training prototype set are the predetermined luminance histograms.

5. The method of claim 4, further comprising applying principal component analysis to the luminance histograms of training images in the training prototype set.

6. The method of claim 4, wherein tuning each training image is performed by a plurality of users and the first predetermined control points values are generated by computing an average of control point values selected by the plurality of users.

7. The method of claim 1, further comprising:
    dividing the digital image into a plurality of image blocks; and
    enhancing pixels in the digital image to generate a final digital image, the enhancing comprising:
        computing second distances from a pixel to the centers of a predetermined number of neighboring image blocks of an image block comprising the pixel;
        computing an enhanced pixel value for the pixel based on the computed second distances, second predetermined control point values corresponding to the neighboring image blocks, and the global tone mapping curve; and
        storing the enhanced pixel value in the final digital image.

8. The method of claim 7, further comprising:
    locating the second predetermined control point values corresponding to each image block of the neighboring image blocks using a mean luminance value and a mean absolute luminance deviation of the image block.

9. The method of claim 7, wherein computing an enhanced pixel value comprises:
generating a local tone mapping curve for each of the neighboring image blocks based on the second predetermined control point values;
merging each local tone mapping curve with the global tone mapping curve to generate a merged tone mapping curve for each of the neighboring image blocks;
applying each merged tone mapping curve to the pixel to generate tone mapped pixel values; and
computing the enhanced pixel value as a weighted average of the tone mapped pixel values, wherein weights used in the weighted average are based on the second distances.

10. The method of claim 7, wherein the predetermined luminance histograms, the first predetermined control points, and the second predetermined control points are predetermined by:
computing luminance histograms for each training image in a plurality of training images;
selecting a subset of the training images in the plurality of training images as a first training prototype set based on distances from each luminance histogram to luminance histograms of training images in the prototype set;
tuning each training image in the first training prototype set based on a first tuning tone mapping curve to generate the first predetermined control point values, wherein the luminance histograms of the training images in the first training prototype set are the predetermined luminance histograms;
enhancing each training image in the first training prototype set to generate enhanced training images, the enhancing comprising:
computing third distances from the luminance histogram of a training image to the luminance histograms of all other training images in the first training prototype set;
estimating third control point values for a tone mapping curve for the training image from first predetermined control point values corresponding to a subset of the luminance histograms of the other training images, the subset selected based on the computed third distances;
interpolating the estimated third control point values to determine the tone mapping curve for the training image; and
applying the tone mapping curve to the training image to generate an enhanced training image;
dividing each enhanced training image into a plurality of image blocks to generate a second training prototype set of image blocks;
computing a mean luminance value and a mean absolute luminance deviation value for each image block in the second training prototype set; and
tuning each image block in the second training prototype set based on a second tuning tone mapping curve to generate the second predetermined control point values.

11. The method of claim 10, further comprising applying principal component analysis to the luminance histograms of training images in the first training prototype set.

12. The method of claim 10, wherein tuning each training image is performed by a plurality of users and the first predetermined control points values are generated by computing an average of control point values for each training image selected by the plurality of users, and wherein tuning each image block is performed by the plurality of users and the second predetermined control points values are generated by computing an average of control point values for each image block selected by the plurality of users.

13. The method of claim 10, wherein the second predetermined control point values are stored based on the mean luminance values and the mean absolute luminance deviations of the image blocks.

14. A digital system comprising:
means for computing a luminance histogram of a digital image;
means for computing first distances from the luminance histogram to a plurality of predetermined luminance histograms;
means for estimating control point values for a global tone mapping curve for the digital image from first predetermined control point values corresponding to a subset of the predetermined luminance histograms selected based on the computed first distances; and
means for interpolating the estimated control point values to determine the global tone mapping curve.

15. The digital system of claim 14, further comprising means for applying the global tone mapping curve to the digital image to generate an enhanced digital image.

16. The digital system of claim 14, wherein the predetermined luminance histograms and the first predetermined control points are predetermined by:
computing luminance histograms for each training image in a plurality of training images;
selecting a subset of the training images in the plurality of training images as a training prototype set based on distances from each luminance histogram to luminance histograms of training images in the training prototype set; and
tuning each training image in the training prototype set based on a tuning tone mapping curve to generate the first predetermined control point values, wherein the luminance histograms of the training images in the training prototype set are the predetermined luminance histograms.

17. The digital system of claim 16, wherein tuning each training image is performed by a plurality of users and the first predetermined control points values are generated by computing an average of control point values selected by the plurality of users.

18. The digital system of claim 14, further comprising:
means for dividing the digital image into a plurality of image blocks;
means for enhancing pixels in the digital image to generate a final digital image, the means for enhancing comprising:
means for computing second distances from a pixel to the centers of a predetermined number of neighboring image blocks of an image block comprising the pixel;
means for computing an enhanced pixel value for the pixel based on the computed second distances, second predetermined control point values corresponding to the neighboring image blocks, and the global tone mapping curve; and
means for storing the enhanced pixel value in the final digital image.

19. The digital system of claim 18, wherein the means for computing an enhanced pixel value comprises:
means for generating a local tone mapping curve for each of the neighboring image blocks based on the second predetermined control point values;

means for merging each local tone mapping curve with the global tone mapping curve to generate a merged tone mapping curve for each of the neighboring image blocks;

means for applying each merged tone mapping curve to the pixel to generate tone mapped pixel values; and means for computing the enhanced pixel value as a weighted average of the tone mapped pixel values, wherein weights used in the weighted average are based on the second distances.

20. The digital system of claim 18, wherein the predetermined luminance histograms, the first predetermined control points, and the second predetermined control points are predetermined by:

computing luminance histograms for each training image in a plurality of training images;

selecting a subset of the training images in the plurality of training images as a first training prototype set based on distances from each luminance histogram to luminance histograms of training images in the prototype set;

tuning each training image in the first training prototype set based on a first tuning tone mapping curve to generate the first predetermined control point values, wherein the luminance histograms of the training images in the first training prototype set are the predetermined luminance histograms;

enhancing each training image in the first training prototype set to generate enhanced training images, the enhancing comprising:

computing third distances from the luminance histogram of a training image to the luminance histograms of all other training images in the first training prototype set;

estimating third control point values for a tone mapping curve for the training image from first predetermined control point values corresponding to a subset of the luminance histograms of the other training images, the subset selected based on the computed third distances;

interpolating the estimated third control point values to determine the tone mapping curve for the training image; and applying the tone mapping curve to the training image to generate an enhanced training image;

dividing each enhanced training image into a plurality of image blocks to generate a second training prototype set of image blocks;

computing a mean luminance value and a mean absolute luminance deviation value for each image block in the second training prototype set; and tuning each image block in the second training prototype set based on a second tuning tone mapping curve to generate the second predetermined control point values.

* * * * *